US 6,707,191 B1

(12) United States Patent
Bye

(10) Patent No.: US 6,707,191 B1
(45) Date of Patent: Mar. 16, 2004

(54) CLOCKSPRING GENERATOR

(75) Inventor: Weston C. Bye, Grand Blanc, MI (US)

(73) Assignee: Pontiac Coil, Inc., Clarkston, MI (US)

( * ) Notice: Subject to any disclaimer, the term of this patent is extended or adjusted under 35 U.S.C. 154(b) by 0 days.

(21) Appl. No.: 10/429,476

(22) Filed: May 5, 2003

(51) Int. Cl.⁷ .............................. H02P 1/00; F21L 13/06
(52) U.S. Cl. ...................... 310/75 A; 290/1 E; 310/257
(58) Field of Search ............................... 310/75 A, 257; 185/9, 40 R; 290/1 E, 1 R; 362/192, 193; 102/207; 322/10, 38, 51

(56) References Cited

U.S. PATENT DOCUMENTS

| | | | | |
|---|---|---|---|---|
| 2,282,963 A | * | 5/1942 | Haynes | 290/1 R |
| 2,389,514 A | * | 11/1945 | Kennedy | 310/75 A |
| 3,342,998 A | * | 9/1967 | Anderson | 290/1 R |
| 3,354,383 A | * | 11/1967 | Walsmann | 322/29 |
| 3,631,274 A | * | 12/1971 | Stauder et al. | 310/66 |
| 4,315,301 A | * | 2/1982 | Jimena | 362/193 |
| 4,318,018 A | * | 3/1982 | Kennedy | 310/164 |
| 4,494,024 A | * | 1/1985 | Braun | 310/75 A |
| 5,552,973 A | * | 9/1996 | Hsu | 362/192 |
| 5,839,817 A | * | 11/1998 | Wei | 362/192 |

FOREIGN PATENT DOCUMENTS

JP  51-117487  * 10/1976  ........... F21L/13/06

* cited by examiner

Primary Examiner—Burton Mullins
(74) Attorney, Agent, or Firm—Young & Basile P.C.

(57) ABSTRACT

A clockspring driven permanent magnet generator comprising a bobbin-mounted coil, inner and outer frame members defining diametrically opposite pole pieces and a structure which cages or essentially surrounds the bobbin and coil combination. A rotor comprising the integral combination of disc and shaft portions carries a two-pole permanent magnet and is, in the assembled structure, located such that the shaft portion extends through the frame structure and the caged coil to place a permanent magnet between the pole pieces which are defined by the caging frame structure. A flat wound clockspring drives the shaft portion relative to the frame structure to induce a short duration voltage in the coil which can be used, by way of example, as an electronic fuse in an explosive device such as a hand grenade.

9 Claims, 4 Drawing Sheets

US 6,707,191 B1

CLOCKSPRING GENERATOR

FIELD OF THE INVENTION

This invention relates to permanent magnet generators and more particularly to a highly-efficient permanent magnet generator driven by a clockspring to produce output voltage of short duration.

BACKGROUND OF THE INVENTION

The electrical theory behind permanent magnet generators is well understood: a permanent magnet having north and south poles is rotated between two or more pole pieces which provide a flux path magnetically linked to a wound wire coil such that rotation of the permanent magnet induces an alternating voltage in the coil. It is also well understood that the intensity or magnitude of the voltage is dependent upon the time rate of change of the flux passing through the pole pieces and this time rate of change is in turn a function of the speed at which the permanent magnet is rotated between the pole pieces.

SUMMARY OF THE INVENTION

The present invention is in essence a small, highly-efficient permanent magnet generator based in operating principle on the electrical theory described above and driven by a clockspring to produce an output voltage of short duration. In general, the clockspring generator of the present invention comprises a wound wire coil, a magnetically efficient and easy-to-assemble frame structure which provides pole pieces on the interior of the coil and a magnetically permeable structure which essentially cages or encloses the coil. The generator further comprises a rotor having a portion which passes through the center of the coil and frame structure so as to rotatably locate a permanent magnet between the pole pieces of the frame structure. In the preferred form, a flat wound clockspring is mechanically mounted between a shaft portion of the rotor and a portion of the frame structure to hold the assembly in a unitary state and to drive the rotor for a short time duration to produce an output voltage in the 15- to 30-volt range.

As hereinafter described, an illustrative and preferred embodiment of the invention comprises a bobbin-mounted coil, a rotor of non-magnetic material having disc and shaft portions, a two-pole permanent magnet mounted within a larger diameter portion of the rotor such that the poles are laterally arranged, inner and outer cup-shaped frame members of magnetically permeable material which are formed in such a fashion as to define opposed pole pieces, annular top and bottom plates and circumferentially spaced interleaved walls to cage the coil and bobbin combination and provide shallow recesses on the top and bottom of the assembled structure. The rotor is assembled to this combination of inner and outer frames such that the shaft projects through the center of the coil cage and locates the permanent magnet between the pole pieces which are defined by the inner and outer frame members respectively. Disc-like brass bushings are added to the assembly to eliminate friction and improve the overall mechanical and electrical operating efficiency of the structure. The caging structure of the cup-shaped frame members effectively shields the coil against the effects of stray magnetic fields. The coil spring holds the assembly together and may be wound to arm the generator by means of slots in the bottom of the rotor disc.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 8:
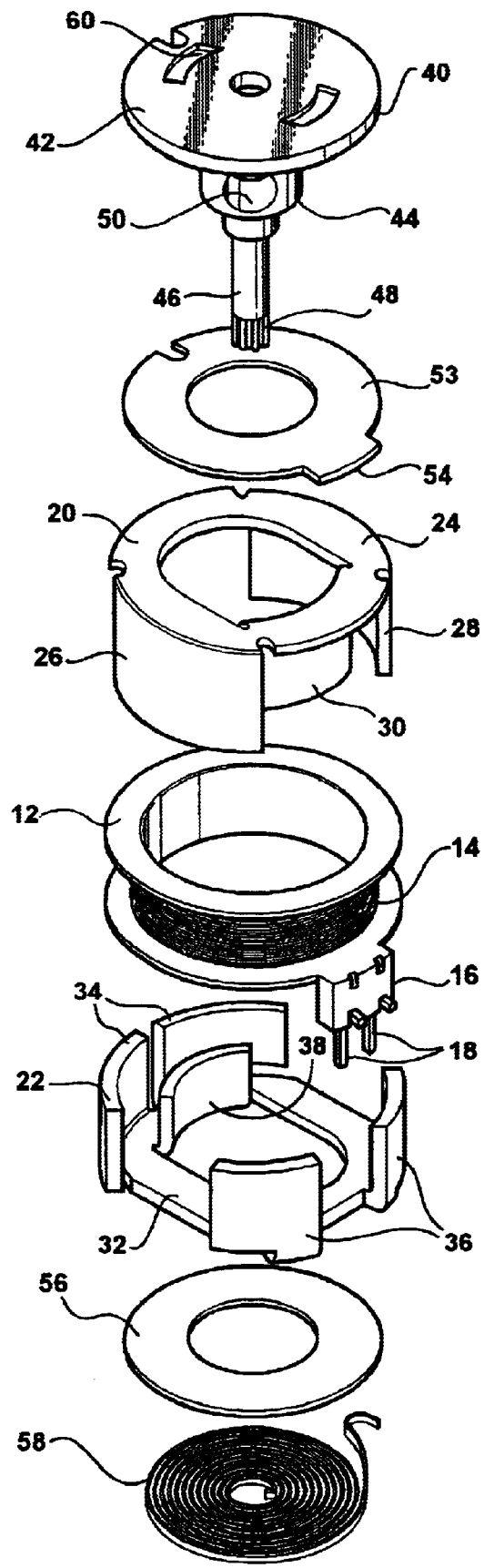
FIG. 8 is an exploded view of the device of FIG. 1.

Referring to the figures, and particularly to FIG. 8, the clockspring generator 10 of the present invention comprises an annular bobbin 12 of insulative non-magnetic material upon which is wound a coil 14 of fine conductive copper wire. The coil 14 is terminated in a structure 16 having conductive leads 18 for connection to a utilization circuit, an example of which is hereinafter described.

Figure 1:
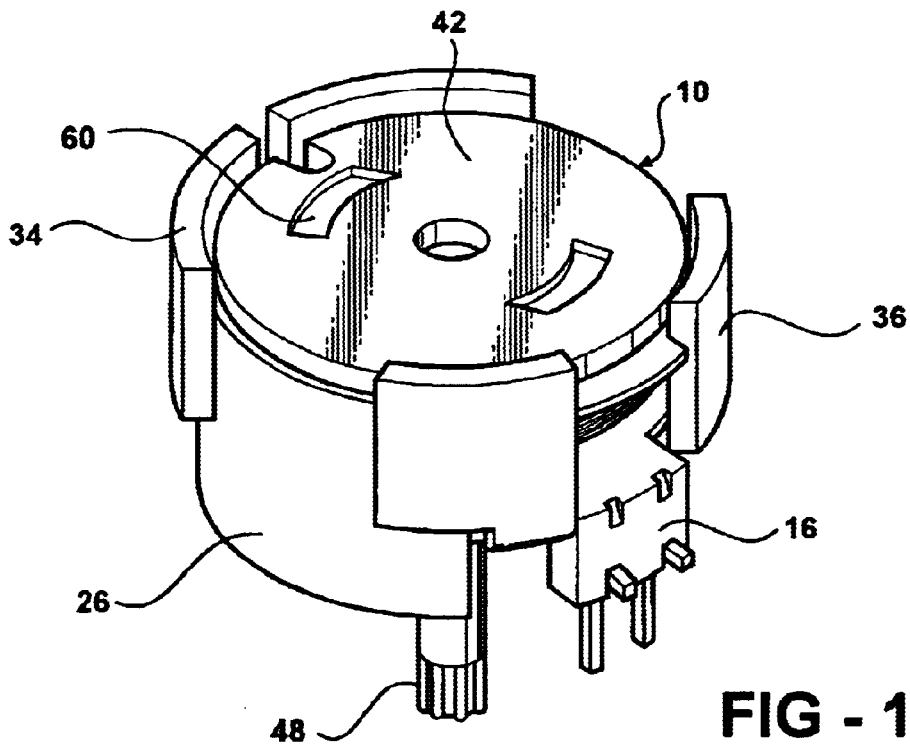
FIG. 1 is a perspective view of a clockspring generator embodying the present invention.
Figure 2:
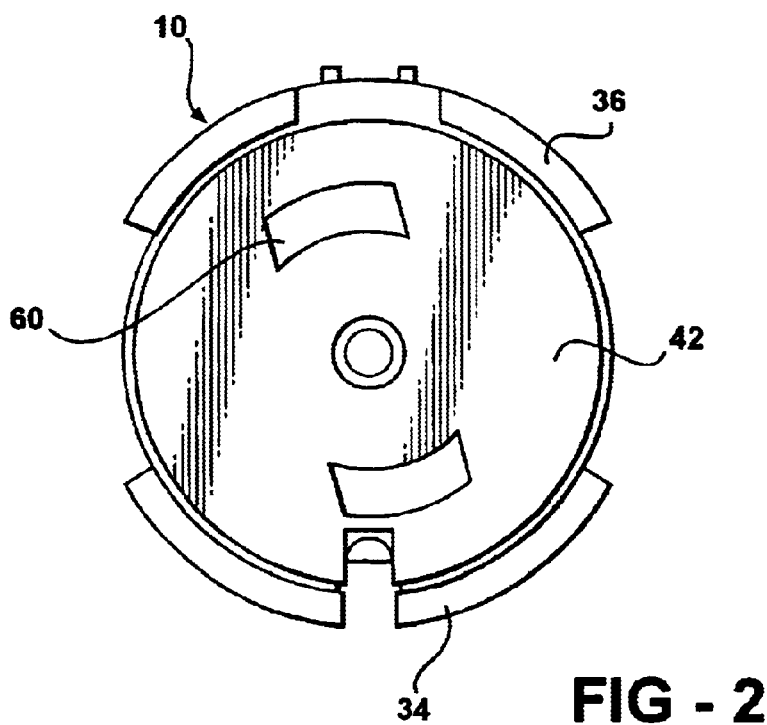
FIG. 2 is a bottom view of the device in FIG. 1.
Figure 3:
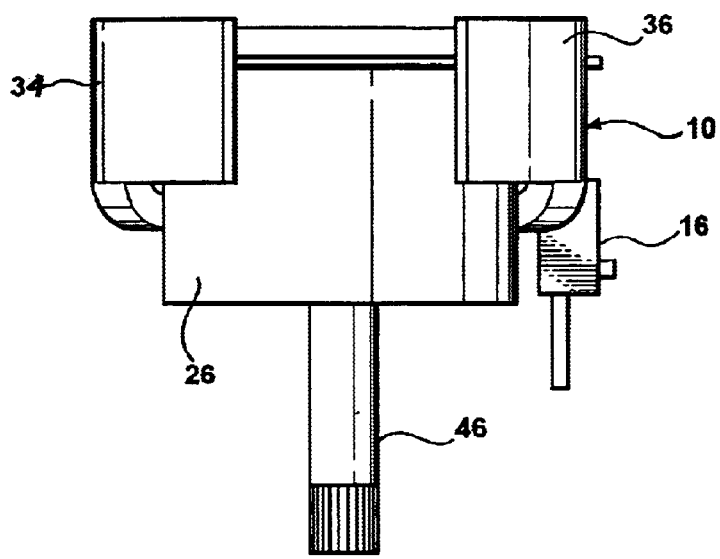
FIG. 3 is a side view from a first vantage point of the device in FIG. 1.
Figure 4:
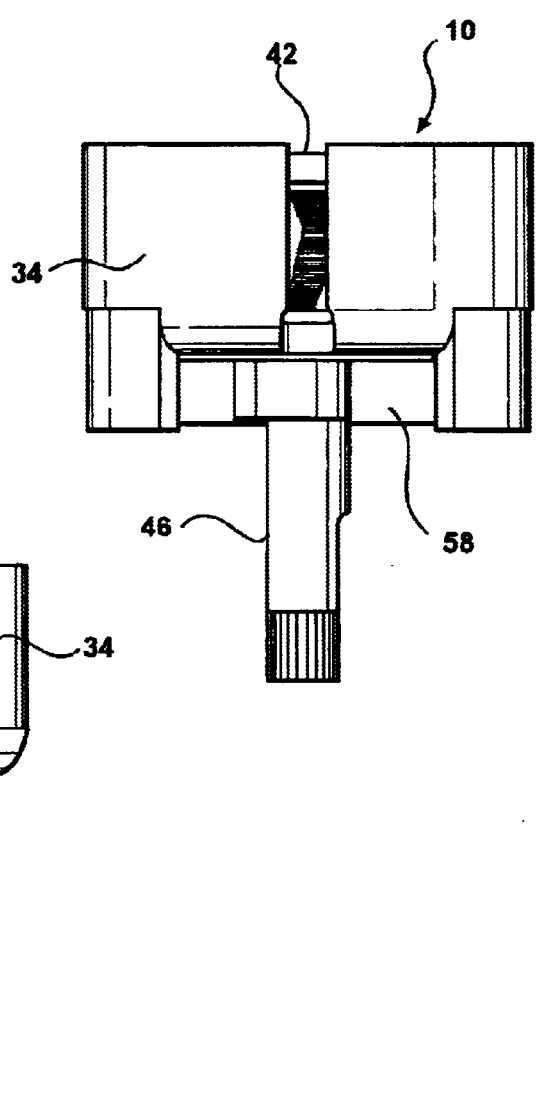
FIG. 4 is another side view from another vantage point of the device in FIG. 1.
Figure 5:
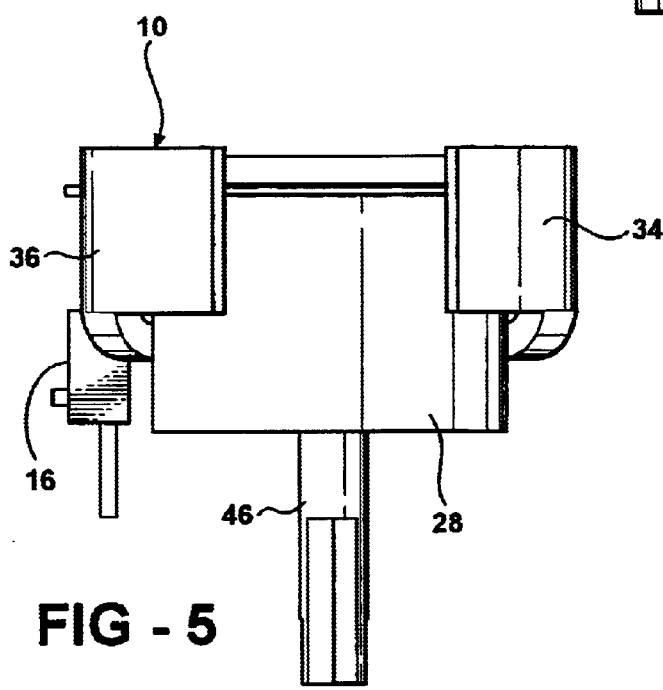
FIG. 5 is a third side view from another vantage point of the device in FIG. 1.

The bobbin 12 with the coil 14 and terminal structure 16 is mounted within a magnetic frame structure comprising cup-shaped ferromagnetic members 20 and 22, hereinafter referred to as the inner and outer frame members, respectively. The inner frame member 20 comprises an annular base 24, opposite outside diameter fingers 26 and 28, and an inside diameter pole piece 30. Outside frame member 22 comprises an annular base 32, spaced-apart outside diameter longitudinal fingers 34 and 36 and an inside pole piece 38. When the frame members 20 and 22 are properly assembled, the fingers 26, 28, 34 and 36 telescope over and inside of one another filly enclosing or caging the coil 14 and bobbin 12 except for a small window which accommodates the terminal structure 16 as best shown in FIG. 1. As the fingers 26, 28, 34 and 36 substantially fully enclose and surround the coil, they protect it against picking up stray magnetic fields. In the assembled position the pole pieces 30 and 38 are diametrically opposite one another and on the inside diameter of the bobbin 12 and coil 14.

Figure 6:
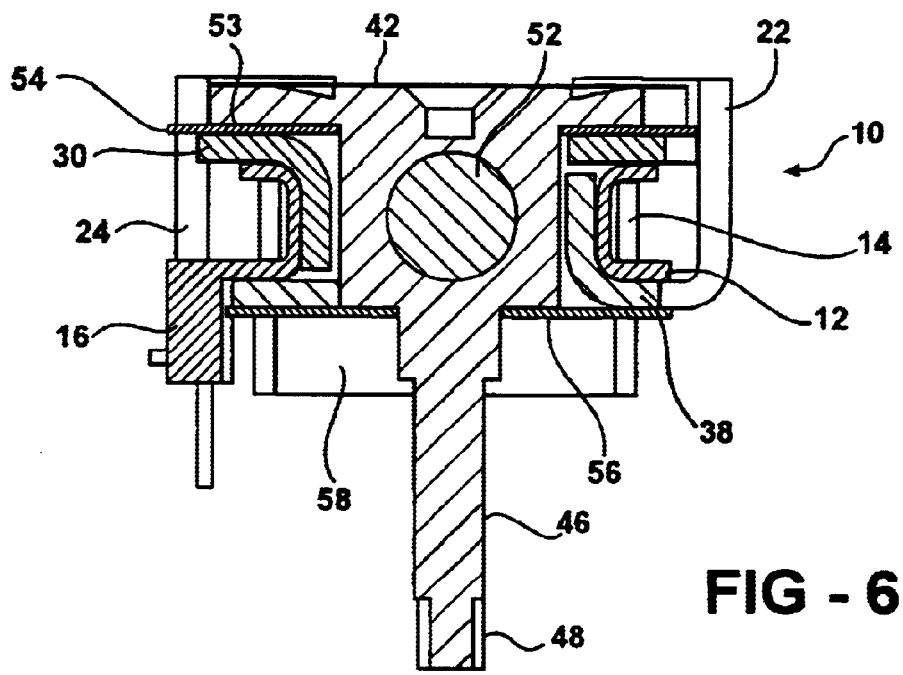
FIG. 6 is a sectional view of the device of FIG. 1.
Figure 7:
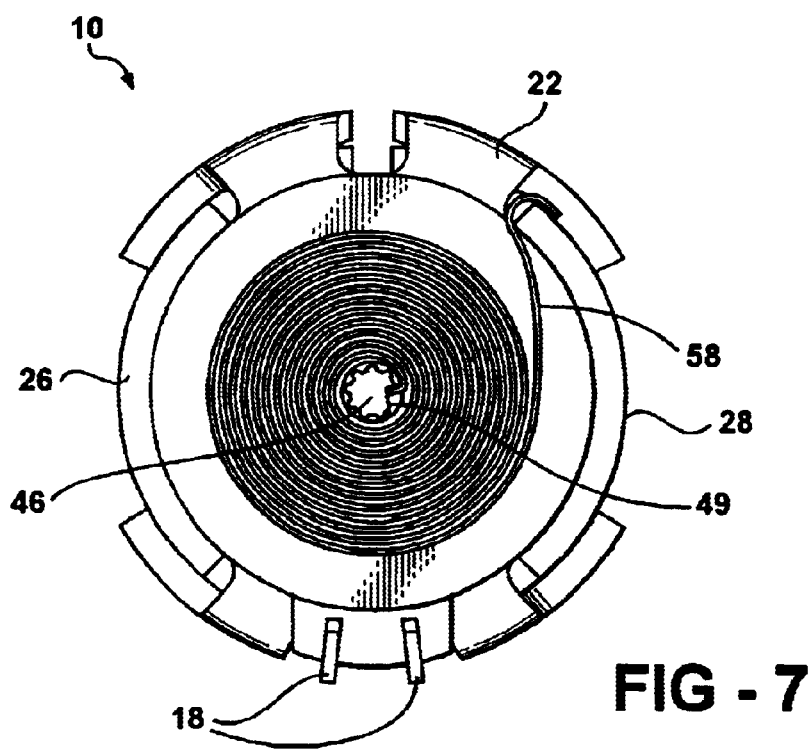
FIG. 7 is a top view of the device of FIG. 1.

The device 10 further comprises a rotor 40 having a disc-shaped base 42 integrally formed with a shaft 46 having an enlarged diameter portion 44 and a splined portion 48 from which a sector 49 is removed as best shown in the top view of FIG. 7. The larger diameter shaft portion 44 has a diametric through-bore 50 which accommodates a pellet-shaped permanent magnet 52 having diametrically opposite north and south poles. In the assembled condition as shown best in FIG. 6, the permanent magnet rotates in a plane which is essentially between the pole pieces 30 and 38.

The device 10 further comprises bronze bushings 53 and 56. Bushing 53 has a tab 54 which is located between the fingers 36 in the assembled form. Bushing 56 is annular.

Finally, the device 10 comprises a clockspring 58 having formed ends which connect to the removed sector 49 of the shaft 46 at the inside end and to the finger 28 which is part of the member 20 on the outside end.

The device 10 is typically assembled in the following order: The coil 14 is wound on the bobbin 12 and electrically connected to the terminal leads 18. The bobbin 12 is placed within the outer frame member 22 so that the bobbin lies between the pole piece 38 and the outside fingers 34. The inner frame member 20 is telescopically assembled over the outer frame member 22 so that the opposite pole piece 30 lies on the inside diameter of the bobbin 12 diametrically opposite the pole piece 38. Bushing 53 is put in place and the rotor 40/shaft 46 are maneuvered into position through the center of the structure. Bushing 56 is placed over the top of the structure and the spring 58 is attached as described above to hold the assembly together. The only crimping or staking operations which are necessary are those which hold the permanent magnet 52 within the diametric through-bore 50 in the diameter portion 44. Arcuate wind-up slots 60 are formed in the disc-like base of the rotor 40 to wind the spring 58 in preparation for use.

One industrial application of the clockspring generator 10 shown in FIGS. 1–8 is in an electronic fuse system for an explosive device such as a hand grenade. In such an application, the spring 58 is tightly wound and the rotor 40 is latched in the wound position by way of a blocking device interposed between a notch in the outer diameter of the rotor 40 and a corresponding slot in the outer frame member 22. A suitable trigger mechanism is provided to release the rotor and allow the spring 58 to spin the rotor at high speed for a short time duration. The voltage which is produced at the terminals 18 is applied through a rectifier to a capacitor thereby charging the capacitor to a voltage between 15 and 30 volts. That voltage is discharged through an RC timing circuit such that the time of the fuse between generation of the voltage and detonation of the explosive device is always the same regardless of how long the unit has been on the shelf This is a distinct advantage over coventional incendiary fuses, the burn time of which varies dramatically with moisture content.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A clockspring generator comprising:
   a rotor of non-magnetic material having integral shaft and disc portions;
   a permanent magnet mounted to said rotor to rotate the poles of said magnet;
   a conductive coil;
   first and second annular frame members of magnetically conductive material surroundingly caging said coil and providing diametrically opposite pole pieces therefor;
   said rotor being assembled to said frame members such that the disc lies on one axial side of the coil, the shaft projects through the frame members and caged coil in a non-contacting fashion and the magnet is disposed between the pole pieces; and
   a clockspring which may be wound up to provide rotational drive for the rotor.

2. A clockspring generator as defined in claim 1 further comprising a disc-like bushing mounted between the rotor disc and one of the annular frame members.

3. A clockspring generator as defined in claim 2 further comprising a second disc-like bushing disposed between the spring and the other of the annular frame members.

4. A clockspring generator as defined in claim 1 wherein winding slots are formed in a surface of said rotor disc.

5. A clockspring generator as defined in claim 1 wherein said first and second frame members have complemental and interdigitated axial walls.

6. A clockspring generator as defined in claim 3 wherein said first and second frame members have complemental and interdigitated axial walls.

7. A clockspring generator as defined in claim 6 wherein the interdigitated walls extend axially beyond the caged coil to provide top and bottom annular recesses and the first and the second disc-like bushings are mounted in said recesses.

8. A clockspring generator as defined in claim 1 wherein the coil is mounted on a non-magnetic bobbin and is provided with a terminal for making electrical connection thereto.

9. A clockspring generator comprising:
   a bobbin having an annular conductive coil mounted thereon;
   a magnetic frame providing diametrically opposite pole pieces within the interior of said coil;
   a rotor carrying a permanent magnet for rotation between said pole pieces; and
   a clockspring which can be wound up and released to produce rotation of the rotor relative to the pole pieces.

* * * * *